(No Model.)
J. HAURY.
ROAD CART.
No. 421,707. Patented Feb. 18, 1890.
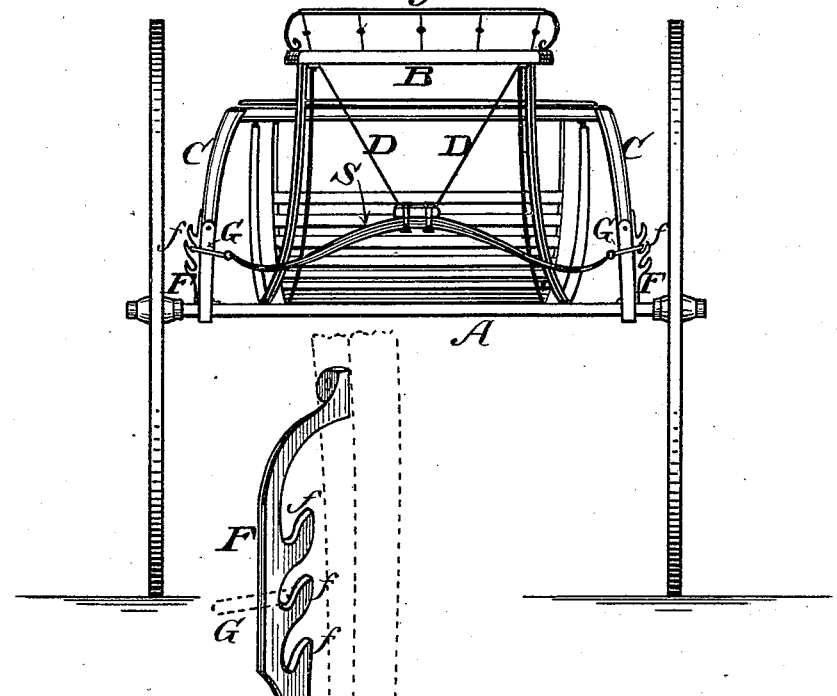
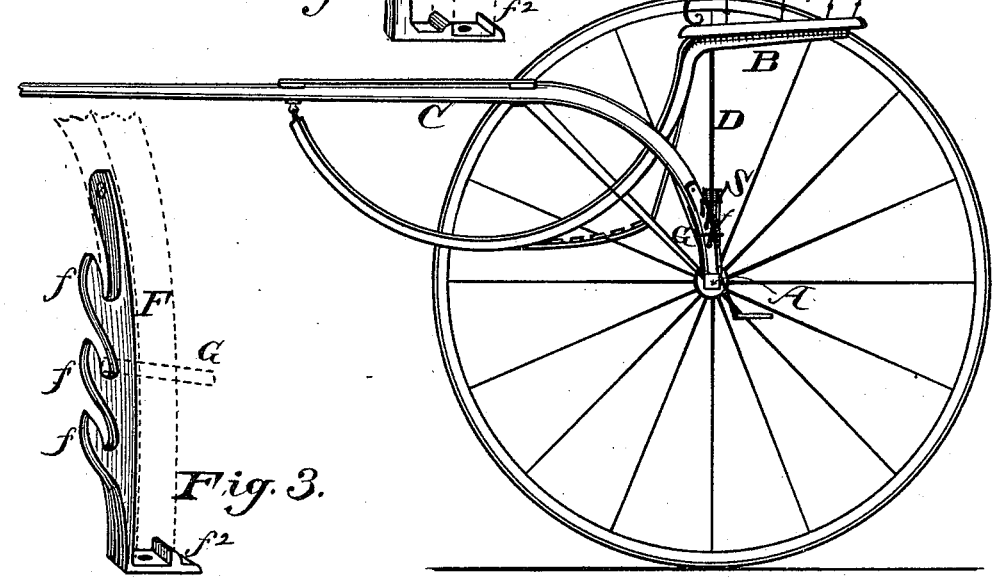
Witness,
Vernon H Burke
Geo B Tibbitts
Inventor,
John Haury,
By his Attorney, Geo. W. Tibbitts

UNITED STATES PATENT OFFICE.

JOHN HAURY, OF ERHART, OHIO.

ROAD-CART.

SPECIFICATION forming part of Letters Patent No. 421,707, dated February 18, 1890.

Application filed May 17, 1889. Serial No. 311,106. (No model.)

*To all whom it may concern:*

Be it known that I, JOHN HAURY, a citizen of the United States, residing at Erhart, in the county of Medina and State of Ohio, have invented a certain new and useful Improvement in Road-Carts, of which the following is a specification.

This invention relates to road-carts or two-wheeled vehicles, and has for its object to provide a ready means of changing the height of the seat-spring in its relation to the axle; and it consists in the combination, with the shafts, of hooked supports for the ends of the spring, whereby the spring may be shifted up or down to accommodate it to the weight of the rider or riders.

My invention is illustrated in the accompanying drawings, in which—

Figure 1 is a side elevation, and Fig. 2 is a rear elevation, of a road cart or sulky having my improvement attached. Figs. 3 and 4 are two forms of a hooked bar which forms the basis of my improvement, which I combine with the thills or shafts of the vehicle.

A is the axle of the vehicle, B the seat, and C C the thills or shafts. The vehicle may be constructed in any of the known forms.

S is the spring supporting the seat by suitable seat-irons D D. The ends of the spring are commonly secured permanently; but to enable it to be adjustably attached I make a loose connection substantially as follows: The thills or shafts are permanently secured to the axle by straps $e\ e$.

F is a bar having hooks $f\ f$ on one side, which is secured to the side of the shafts at their junction with the axle by means of a foot $f^2$, placed between the end of the shaft and axle. It is thus secured at its lower end by the straps $e$, the upper end being fastened by a screw. Through the foot is also a hole, in which a dowel-pin in the end of the shaft is inserted to take the strain of the pull by the spring.

G is a link, one of which is attached to each end of the spring, and which embrace the shafts and their hook-bars, and are of sufficient length to enable them to slip up or down over the hooks for the purpose of elevating or lowering the spring when desired.

The hook-bar shown in Fig. 4 is designed to be attached to the inside of the shafts for the purpose of supporting the ends of the spring; but this would require the spring to be made shorter, and it would not be so strong or capable of resisting the strain upon it. That shown in Fig. 3 is therefore preferable.

Having described my invention, I claim—

In a road-cart, the open-hooked bars F F, having steps $a^2$ for securing them under the end of the thills C C, in combination with spring S, provided with links G G, surrounding the shafts, substantially as shown and described.

JOHN HAURY.

Witnesses:
GEO. W. TIBBITTS,
JOHN W. TAYLOR.